(12) United States Patent
Hirasawa et al.

(10) Patent No.: US 8,743,393 B2
(45) Date of Patent: Jun. 3, 2014

(54) PRINTING MANAGEMENT APPARATUS, PRINTING MANAGEMENT METHOD, AND PROGRAM FOR THE SAME

(75) Inventors: Masahiko Hirasawa, Sapporo (JP); Junichi Takenuki, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 12/721,465

(22) Filed: Mar. 10, 2010

(65) Prior Publication Data

US 2010/0231968 A1 Sep. 16, 2010

(30) Foreign Application Priority Data

Mar. 12, 2009 (JP) ................................. 2009-060084

(51) Int. Cl.
*G06F 3/12* (2006.01)

(52) U.S. Cl.
USPC ............ 358/1.15; 358/1.6; 358/1.9; 358/1.13

(58) Field of Classification Search
USPC ............... 358/1.15, 1.16, 1.6, 1.9, 1.13, 1.14, 358/401, 501; 382/276
See application file for complete search history.

(56) References Cited

U.S. PATENT DOCUMENTS

| | | | |
|---|---|---|---|
| 6,201,611 B1 * | 3/2001 | Carter et al. | 358/1.15 |
| 6,712,441 B2 * | 3/2004 | Sato et al. | 347/15 |
| 7,349,972 B2 * | 3/2008 | Robinson et al. | 709/229 |
| 7,907,313 B2 * | 3/2011 | Kurihara | 358/500 |
| 2003/0197892 A1 | 10/2003 | Fukuoh | |
| 2003/0202202 A1 * | 10/2003 | Miyata | 358/1.14 |
| 2005/0237572 A1 * | 10/2005 | Mori et al. | 358/1.17 |
| 2008/0259393 A1 | 10/2008 | Iura et al. | |

FOREIGN PATENT DOCUMENTS

| | | |
|---|---|---|
| JP | 06-238990 A | 8/1994 |
| JP | 2000-118095 A | 4/2000 |
| JP | 2003-186641 A | 7/2003 |
| JP | 2003-316530 A | 11/2003 |
| JP | 2004-054509 A | 2/2004 |
| JP | 2007-066112 A | 3/2007 |
| JP | 2008-269404 A | 11/2008 |

* cited by examiner

*Primary Examiner* — Vu B Hang
(74) *Attorney, Agent, or Firm* — Kilpatrick Townsend & Stockton LLP

(57) ABSTRACT

A printing management apparatus includes a memory device storing information and having a shared folder for storing a print job from the outside of the apparatus, a standby folder for storing print data to be output to a predetermined printing mechanism, and a converter having a plurality of conversion modules performing a conversion process in which the print job is converted into the print data which is printed in the predetermined printing mechanism to store the data in the standby folder when the format of the print job in the shared folder is supported; an obtaining unit for obtaining the print job stored in the shared folder; and conversion control means for selecting a compliant conversion module from the plurality of conversion modules in the converter, the compliant conversion module performing the conversion process to the print job obtained by the obtaining unit, the compliant conversion module being the conversion module which supports the format of the print job obtained by the obtaining unit.

13 Claims, 4 Drawing Sheets

| THE NAME OF CONVERTER | SUPPORTED FORMAT | ORDER OF CHECKING | CHECKED |
|---|---|---|---|
| FIRST CONVERTER | ***.○○○ | 1 | |
| SECOND CONVERTER | ***.×××  | 2 | |
| THIRD CONVERTER | ***.□□□ | 3 | |

PRINTING MANAGEMENT APPARATUS, PRINTING MANAGEMENT METHOD, AND PROGRAM FOR THE SAME

BACKGROUND

1. Technical Field

This application claims priority to Japanese Patent Application No. 2009-060084, filed Mar. 12, 2009, the entirety of which is incorporated by reference herein.

The present invention relates to a printing management apparatus, a printing management method, and a program for the same.

2. Related Art

There has been proposed a printing management apparatus in a system where a central processing unit (CPU) of a server monitors storage of document in a hot folder at a predetermined time interval and when the document stored in the hot folder is detected, the document is registered as a job (see, for example, JP-A-2000-118095). In the apparatus, the document stored in the hot folder is automatically registered as the job, resulting in saving labor of operators.

In this type of printing management apparatus, formats of documents stored in the hot folder may often vary. When these documents are registered as jobs and are converted into print data which are printed in a printer, It is desirable to make more formats of documents be more easily processed.

SUMMARY

An advantage of some aspects of a printing management apparatus, a printing management method and a program for the same of the invention is to make more formats of print jobs be more easily processed when print jobs from the outside of the apparatus are converted into print data which are printed in a printer.

The following inventive approaches are employed for taking the above advantage of the invention.

According to an aspect of the invention, there is provided a printing management apparatus including a memory device storing information and having a shared folder for storing a print job from the outside of the apparatus, a standby folder for storing print data to be output to a predetermined printing mechanism, and a converter having a plurality of conversion modules performing conversion processes in which the print job is converted into the print data which is printed in the predetermined printing mechanism to store the converted print data in the standby folder when the format of the print job in the shared folder is supported. The printing management apparatus further includes an obtaining unit for obtaining the print job stored in the shared folder and a conversion control means for selecting a compliant conversion module, which supports the format of the print job obtained by the obtaining unit, from the plurality of modules in the converter, so that the compliant conversion module performs the conversion process to the print job obtained by the obtaining unit.

The printing management apparatus according to the aspect of the invention obtains a print job stored in the shared folder for storing a print job from the outside of the apparatus. Then, the compliant conversion module is selected from a plurality of conversion modules in the converter to perform the conversion process to the obtained print job by the compliant conversion module. The compliant conversion module is a conversion module which supports the format of the obtained print job. The converter has the plurality of conversion modules performing the conversion process in which the print job is converted into the print data which is printed in the predetermined printing mechanism and storing the print data in the standby folder for storing the print data to be output to the predetermined printing mechanism when the format of the print job in the shared folder is supported. The above described advantage makes any of the plurality of conversion modules included in the converter process the print job, so that more formats of the print job may be supported. Furthermore, because the compliant conversion module may be added to the converter when the converter does not have the compliant conversion module, the changes in specifications may be excluded in the conversion modules which have been preliminarily included in the converter, an output unit to output the print data in the standby folder to the printing mechanism, and the printing mechanism, so that more formats of the print jobs are more easily supported. The conversion processes include not only a process to convert the print job into the print data and store the print data in the standby folder, but also a process to delete the print data before the conversion.

In the printing management apparatus according to the aspect of the invention, the conversion control means may also be a means for performing a determination process on the basis of a predetermined sequence until it is determined that a selected conversion module supports the print job obtained by the obtaining unit while the selected conversion module is being changed, the determination process determining whether or not the selected conversion module selected from the conversion modules in the converter supports the print job. When it is determined that the selected conversion module supports the print job, the selected conversion module determined performs the conversion process as the compliant conversion module. Accordingly, a disadvantage that the plurality of conversion modules are determined as compliant conversion modules may be excluded.

Furthermore, in the printing management apparatus according to the aspect of the invention, the conversion control means may be a means for transferring the print job obtained by the obtaining unit into a related folder related to the compliant conversion module and converting the transferred print job into print data to store the data in the standby folder, as the conversion process of the print job. This process allows the print job to be temporarily transferred into the related folder and to be converted into the print data and stored in the standby folder.

Furthermore, in the printing management apparatus according to the aspect of the invention, when there is not the compliant conversion module but the compliant conversion module may be obtained from the outside of the apparatus, the conversion control means may obtain a compliant conversion module from the outside of the apparatus to add the module to the converter and perform the conversion process with the added compliant conversion module. Thus, the conversion process may be performed by the compliant conversion module obtained from the outside of the apparatus and added to the converter. The compliant conversion module may be obtained, for example, by a computer connected to the printing management apparatus via networks such as a LAN and the Internet and by external devices (CDs, DVDs, USB memory devices) connected to the printing management apparatus.

Furthermore, in the printing management apparatus according to the aspect of the invention, the conversion control means may be a means for outputting unsupported information indicating the absence of the compliant conversion module when there is not the compliant conversion module. Then the conversion control means may prompt users to perform an operation for adding the compliant conversion module to the printing management apparatus.

In addition, in the printing management apparatus according to the aspect of the invention, each of the plurality of conversion modules may be a means for performing, during the conversion process, at least one of printing settings in the predetermined printing mechanism including the settings for an amount of ink in printing, color in the printing, and addition of a predetermined image.

In the printing management apparatus according to the aspect of the invention, the conversion control means may select the compliant conversion module using a management list for managing the information on a plurality of conversion modules in the converter, and then the compliant conversion module performs the conversion process to the print job obtained by the obtaining unit using the compliant conversion module. In this case, when the conversion module is added to the converter, the conversion control means may include an addition means for adding information related to the added conversion module to the management list.

According to an aspect of the invention, there is provided a printing management method in a printing management apparatus including a memory device storing information and having a shared folder for storing a print job from the outside of the apparatus, a standby folder for storing print data to be output to a predetermined printing mechanism, and a converter having a plurality of conversion modules performing conversion processes in which a print job is converted into print data which is printed in predetermined printing mechanism to store the converted print data in the standby folder when the format of the print job in the shared folder is supported. The printing management method includes:
(a) obtaining the print job stored in the shared folder; and
(b) selecting a compliant conversion module, which supports the format of the print job obtained in the process (a), from the plurality of conversion modules in the converter, and the compliant conversion module performing the conversion process to the obtained print job.

In the printing management method according to the aspect of the invention, a print job stored in the shared folder for storing a print job from the outside of the apparatus is obtained. Then, the compliant conversion module is selected from a plurality of conversion modules in the converter to perform the conversion process to the obtained print job by the compliant conversion module, the compliant conversion module being a conversion module which supports the format of the obtained print job, and the converter having the plurality of conversion modules performing the conversion process in which the print job is converted into the print data which is printed in the predetermined printing mechanism and storing the print data in the standby folder for storing the print data to be output to the predetermined printing mechanism when the format of the print job in the shared folder is supported. The above described advantage makes any of the plurality of conversion modules included in the converter process the print job, so that more formats of the print job may be supported. Furthermore, because the compliant conversion module may be added to the converter when the converter does not have the compliant conversion module, the changes in specifications may be excluded in the conversion modules which have been preliminarily included in the converter, an output unit to output the print data in the standby folder to the printing mechanism, and the printing mechanism, so that more formats of the print jobs are more easily supported.

According to an aspect of the invention, there is provided a program which makes each of the processes of the printing management method be processed in one or more computers.

The program may be recorded in storage mediums (for example, hard disks, ROMs, FDs, CDs, and DVDs) that computers may read, or may be distributed from a computer to another computer via transmission mediums (for example, communication networks such as the Internet and a LAN), or may be transmitted and received in any manner possible. This program is executed in a single computer or a plurality of computers sharing each process, so that each process of the printing management method may be performed, resulting in the same effect as that of the printing management method.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
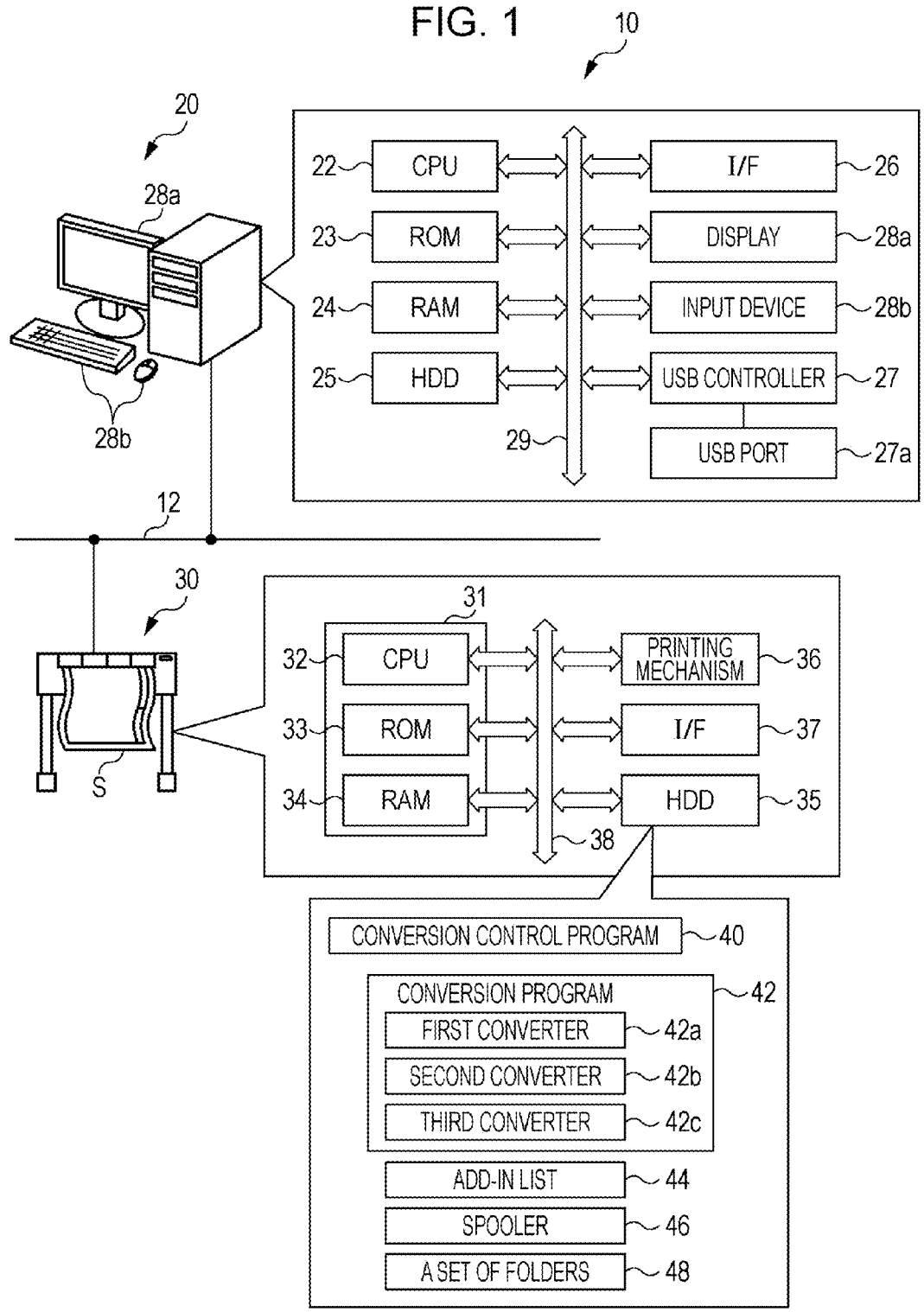
FIG. 1 shows a diagram schematically illustrating a configuration of a printing system.

Embodiments of the invention will be described with reference to the accompanying drawings. FIG. 1 is a diagram schematically illustrating a configuration of a printing system 10 as an embodiment of the invention. The printing system 10 of the embodiment has a user personal computer (PC) 20 connected to a network 12 such as the Internet and a LAN, and a printer 30 connected to the network 12. The user PC 20 is not limited to a single PC. Two or more PCs 20 may be provided.

The user PC 20 is configured as a general-purpose PC which is well known. The user PC 20 includes a CPU 22 performing various types of control, a ROM 23 storing various types of control programs, a RAM 24 temporarily storing data, a hard disk drive (HDD) 25 of a large capacity memory storing various types of application programs and data files, an interface (I/F) 26 exchanging data with external devices connected to the network 12, a USB controller 27 which may input information from and output information to the external devices (for example, USB memory devices) connected to a USB port 27a, a display 28a displaying various types of information, and an input device 28b such as a keyboard and a mouse with which users can input various commands. Each of the CPU 22, ROM 23, RAM 24, HDD 25, I/F 26, USB controller 27, display 28a, and input device 28b is electrically connected to each other via a bus 29. The user PC 20 has functions of transmitting a print job to a hot folder 50 (a shared folder, see FIG. 3) stored in the HDD 35 of the printer 30 and displaying information of the printer 30 on the display 28a. The print job in the embodiment includes image data of document and picture image, and a Job Definition Format (JDF) defining a setting related to printing. The JDF includes, for example, specifications for a paper size, a layout, and both-sides printing/single-side printing.

Figures 2, 3:
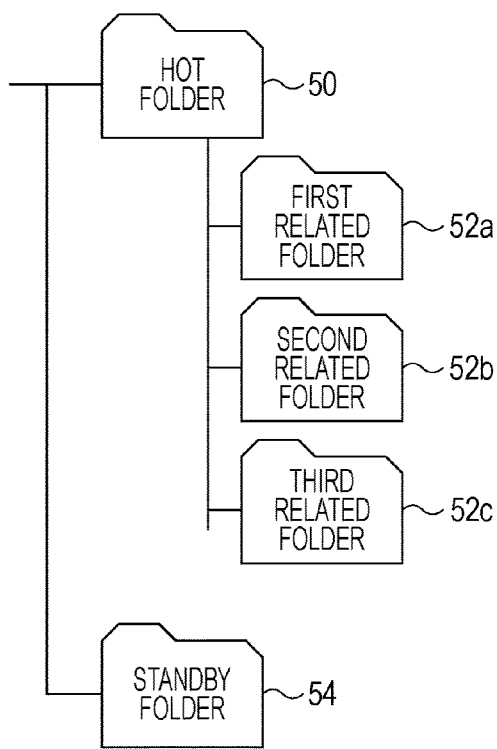
FIG. 2 shows an explanatory diagram illustrating an example of an add-in list.
FIG. 3 shows an explanatory diagram illustrating an example of a set of folders.

The printer 30 is configured such that a print job stored in the hot folder 50 via the network 12 is converted into print data which is printed in a printing mechanism 36 to be described below (print data corresponding to specifications of the printing mechanism 36), leading to be printed on a recording paper S by the printing mechanism 36 using the print data. The printer 30 includes: a controller 31 with a CPU 32 performing various types of control, a ROM 33 storing various types of control programs, and a RAM 34 temporarily storing data; a HDD 35 storing various types of application programs and data files; the printing mechanism 36 performing printing on the recording paper S; and an I/F 37 exchanging data with an external device connected to the network 12. Each of the CPU 32, ROM 33, RAM 34, HDD 35, printing mechanism 36, and I/F 37 is electrically connected to each other via a bus 38. In this embodiment, the controller 31 and the HDD 35 mainly correspond to the printing management apparatus. The printing mechanism 36 is configured as an ink jet printing mechanism performing printing on the recording paper S by applying pressure on various colors of inks (for example, each color of cyan (C), magenta (M), yellow (Y), and black (K)) supplied from ink cartridges to eject inks from nozzles onto the recording paper S (not shown). In addition, the application of pressure on the inks may be performed through applying a voltage to a piezoelectric element to deform the element, or performed by a bubble generated by applying a voltage to a heat element (for example, a heater) to heat inks. The HDD 35 stores: a print conversion control program 40 having a function of controlling the conversion of the print job into the print data by any converter included in a conversion program 42; the conversion program 42 including a first converter 42a converting a first format of the print job in the hot folder 50 (the shared folder, see FIG. 3) for storing the print job (including image data and a JDF) into print data and storing the data in a standby folder 54 for output of the data to the printing mechanism 36, a second converter 42b converting a second format of the print job in the hot folder 50 into print data and storing the data in the standby folder 54, and a third converter 42c converting a third format of the print job in the hot folder 50 into print data and storing the data in the standby folder 54; an add-in list 44 for managing the information of each converter included in the conversion program 42; a spooler 46 outputting the print data in the standby folder 54 to the printing mechanism 36; and a set of folders 48 including a first related folder 52a related to the hot folder 50, the standby folder 54, and the first converter 42a, a second related folder 52b related to the second converter 42b, and a third related folder 52c related to the third converter 42c. The first to third converters 42a to 42c are each configured so as to be used for variable printing (for example, printing in which preselected image data such as logo data is added to the image data of a print job), printing of RAW data, and printing performing color matching or not performing color matching. In the case of conversion of the print job into the print data, the converters have functions of adding logo data, performing color matching, settings of inks ejected from each nozzle of the printing mechanism 36 (for example, the settings for adjusting dot sizes formed on the recording paper S in consideration of characteristics and aging of each nozzle of the printing mechanism 36) and writing these settings on the JDF included in the print job, depending on the specifications of each converter. In addition, the functions of each of the first to third converters 42a to 42c may be any function in so far as converting the print job into the print data. FIG. 2 is an explanatory diagram illustrating an example of the add-in list 44. In this embodiment, the add-in list 44 has information including "the name of converter" of each converter included in the conversion program 42, "supported format" as a supportable format of the print job (for example, an extension or the like of image data included in the print job), "order of checking" as order for determining whether or not the format of the print job is supported, and "checked" indicating whether or not determination has been performed. FIG. 3 is an explanatory diagram illustrating an example of the set of folders 48. Although the first to third related folders 52a to 52c are subordinated to the hot folder 50 (shared folder) in the example of FIG. 3, they may be provided in parallel with the hot folder 50. In addition, in this embodiment, the first to third converters 42a to 42c and the first to third related folders 52a to 52c are stored in the HDD 35, the respective numbers of the converters and the related folders are not limited to three, and may be two, four, or more.

Figure 4:
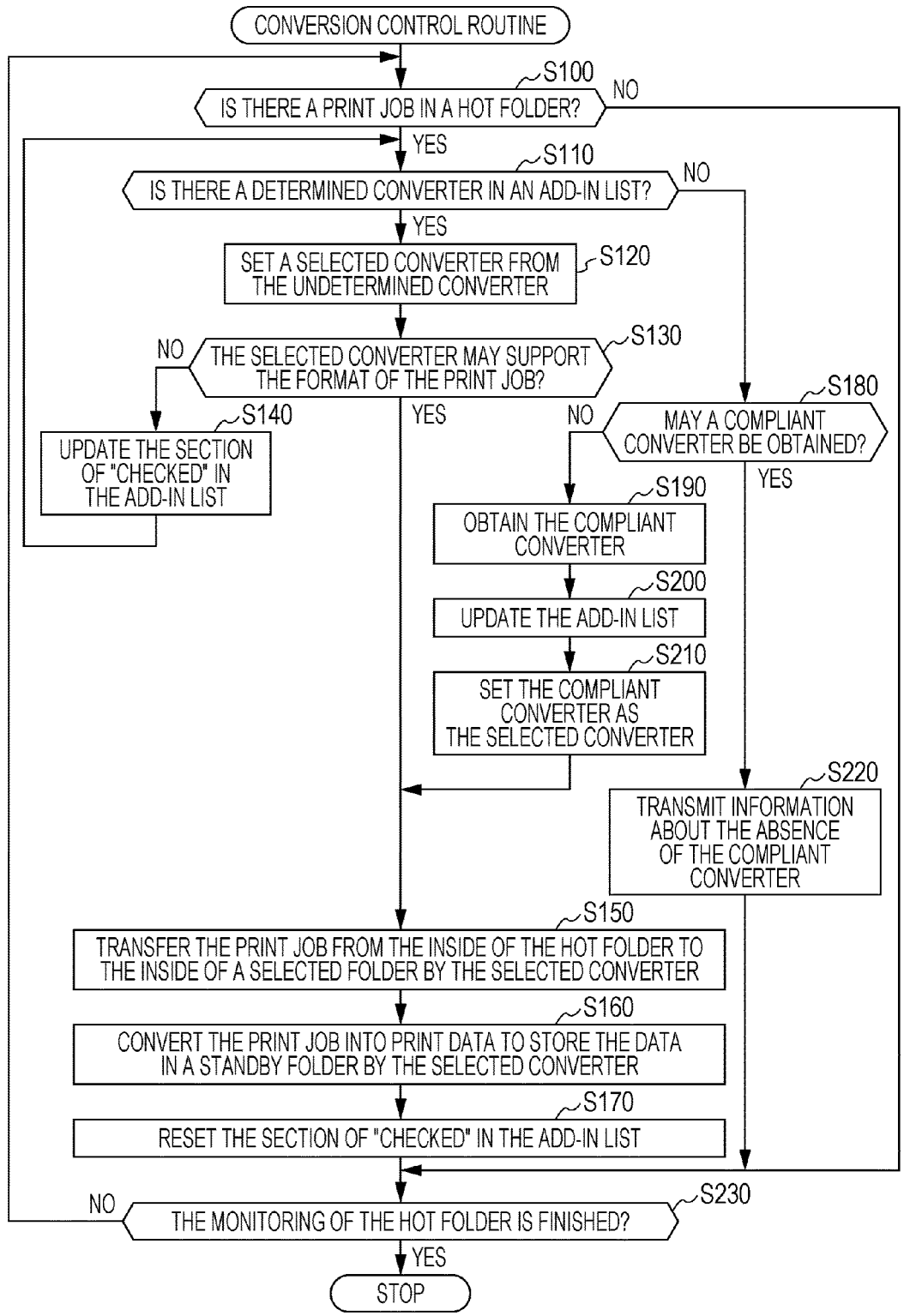
FIG. 4 shows a flow chart illustrating an example of a conversion control routine.

Next, operation of the printer 30 of this embodiment is described below, specifically the operation when the user PC 20 is operated to store print jobs (including image data and a JDF) in the hot folder 50 is described. FIG. 4 is a flow chart illustrating an example of a conversion control routine performed by the CPU 32 of the controller 31 in the printer 30. The routine is executed by loading the conversion control program 40 stored in the HDD 35 when power of the printer 30 is turned on.

Once the conversion control routine is executed, the CPU 32 of the controller 31 first determines whether or not there is a print job in the hot folder 50 (whether or not the print job is received) (process S100). When there is not the print job in the hot folder 50, the CPU 32 determines whether or not the monitoring of the contents of the hot folder 50 should be finished (process S230). When it is determined not to finish monitoring, the routine backs to the process S100. When it is determined to finish the monitoring, a processing routine for a printing management finishes. In these processes, whether or not to finish the monitoring of the contents of the hot folder 50 may be determined by checking whether or not power of the printer 30 is turned off.

When the CPU 32 determines that there is a print job in the hot folder 50, it is determined using the add-in list 44 whether or not there is a converter in the first to third converters 42a to 42c which still does not determine whether or not the print job in the hot folder 50 is supported (hereinafter referred to as an undetermined converter) (process S110). This determination is a process for determining whether or not all of the converters included in the conversion program 42 have been determined whether or not the print job is supported.

When it is determined that there are undetermined converters, a single converter is selected from the undetermined converters (hereinafter referred to as a selected converter) on the basis of order of checking in the add-in list 44 (process S120), and it is determined whether or not the selected converter supports the format of a print job in the hot folder 50 (process S130). When the selected converter may not support the format of the print job, the section of "checked" corresponding to the selected converter in the add-in list 44 is checked, so that the add-in list 44 is updated (process S140), and the routine returns to the process S110. In these processes, the processing in the process S130 may be performed by, for example, checking whether or not the selected converter supports the extension or the like of image data included in the print job.

Figure 5:
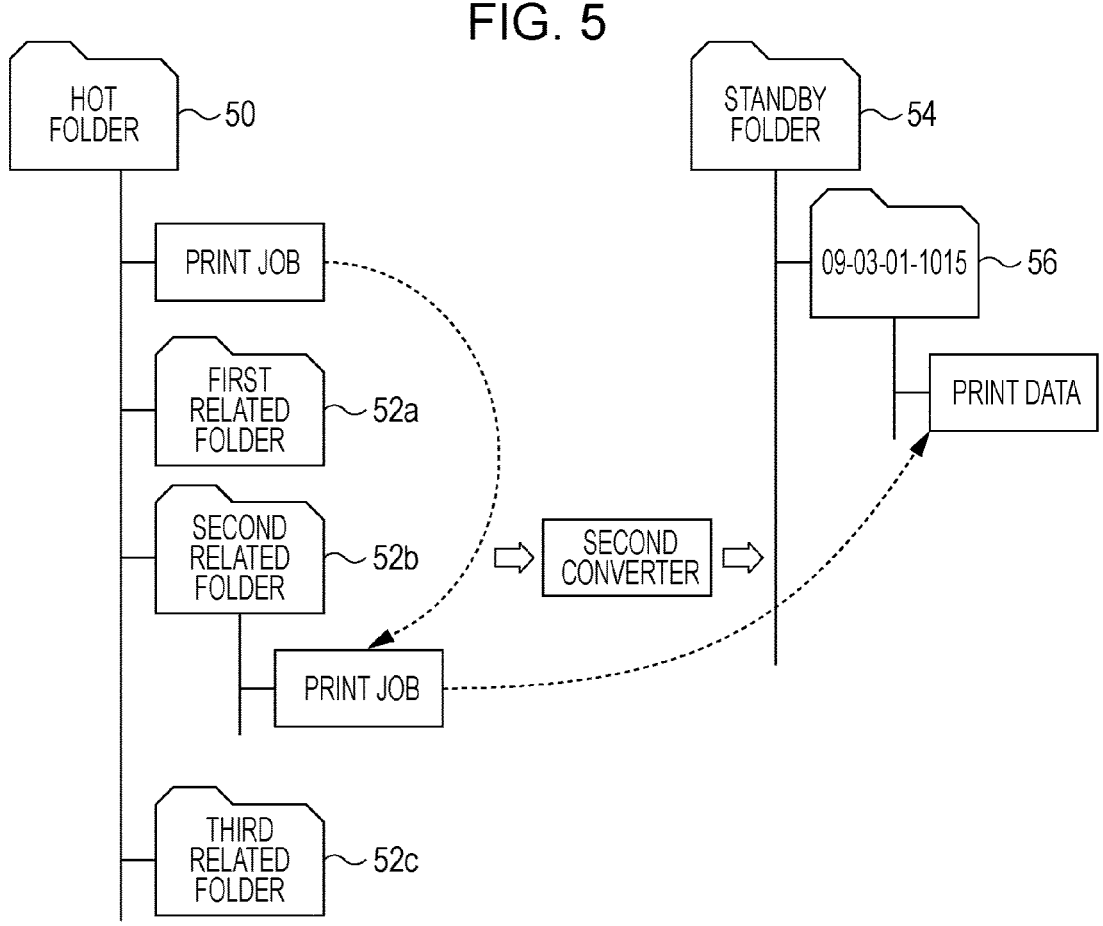
FIG. 5 shows an explanatory diagram illustrating an execution example of a conversion process.
Figure 6:
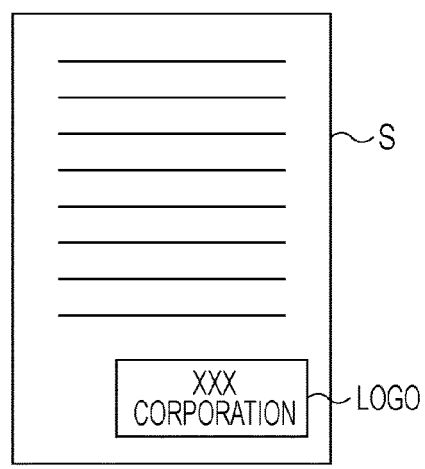
FIG. 6 shows an explanatory diagram illustrating an example of printed recording paper.

When the selected converter supports the format of the print job in the process S130, the selected converter transfers the print job from the hot folder 50 to a folder selected from the first to third related folders 52a to 52c and related to the selected converter (hereinafter referred to as a selected folder), converts the transferred print job into print data, and stores the data in the standby folder 54 (processes S150 and S160). The sections of "checked" in the add-in list 44 are all reset to update the add-in list 44 (process S170), and then process S230 and processes following the process S230 are performed. In addition, in the conversion process, when the print job in the selected folder is converted into the print data and stored in the standby folder 54, this print job in the selected folder is deleted. FIG. 5 is an explanatory diagram illustrating an example of the conversion process. In the example shown in FIG. 5, the second converter 42*b* transfers the print job including image data and a JDF from the hot folder 50 to the second related folder 52*b*, creates a folder (for example, a folder name of date and hour, hereinafter referred to as a sub-standby folder 56) in the standby folder 54, and converts the print job in the second related folder 52*b* into print data and stores the data in the sub-standby folder 56, thereby performing the conversion process. In these processes of the embodiment, logo data is added to the image data in the print job, as the conversion process by the second converter 42*b*, in order to perform variable data printing. After the print data is stored in the sub-standby folder 56 in the standby folder 54 in this way, the CPU 32 outputs the print data (including image data and JDF) in the sub-standby folder 56 to the printing mechanism 36 using the spooler 46. The printing mechanism 36 performs printing on the recording paper S according to the print data. FIG. 6 illustrates an example of the printed recording paper S through this process. A converter (the selected converter) which is selected from a plurality of converters 42*a* to 42*c* and supports a print job in the hot folder 50 transfers the print job from the hot folder 50 to the selected folder, converts the transferred print job into print data and stores the data in the standby folder 54 in this way. This advantage makes a print job, which may be supported by any of a plurality of converters, be supported, so that more formats of print jobs may be supported.

When it is determined that there is not any undetermined converter in the add-in list 44 in the process S110, it is concluded that whether or not a print job is supported has been determined for all of the converters included in the conversion program 42, and it is determined whether or not a compliant converter can be obtained from the outside of the printer 30 (process S180). This process may be performed by determining whether or not the compliant converter is obtained via the network 12, for example, from computers (including the user PC 20) connected to the network 12 such as a LAN and the Internet and from devices outside of the apparatus (for example, USB memory devices, CDs, and DVDs) exchanging data with the printer 30 and a computer. In this embodiment, the process is performed by determining whether or not a predetermined website stored in the HDD 35 is accessed to download the compliant converter from the website via the network 12.

When it is determined that the compliant converter is obtained from the outside of the printer 30, the compliant converter is obtained via the network 12 and added to the conversion program 42 in the HDD 35 (process S190). The added compliant converter is added to the add-in list 44 and the add-in list 44 is updated (process S200). The added compliant converter is set as a selected converter (process S210), and then process S150 and processes following the process S150 are performed. These processes make the print job in the hot folder 50 be supported by obtaining the compliant converter from the outside of the printer 30 and adding the compliant converter to the conversion program 42 even when there is not the compliant converter in the conversion program 42 in the HDD 35 of the printer 30. Accordingly, the changes in specifications are excluded in the conversion control program 40, the first to third converters 42*a* to 42*c* in the conversion program 42, the spooler 46, and the printing mechanism 36. As a result, more formats of the print jobs in the hot folder 50 are allowed to be more easily supported.

When it is determined that the compliant converter may not be obtained from the outside of the printer 30 in the process S180, a signal indicating the unsupported condition, that is, the absence of the compliant converter is transmitted to the user PC 20 (process S220) and then process S230 and processes after the process S230 are performed. Upon reception of the signal, the user PC 20 displays information indicating the absence of the compliant converter on a display 28*a*. In addition, after this, when users operate the user PC 20 or the printer 30 to add a compliant converter to the conversion program 42 in the HDD 35, process S200 and processes after the process S200 may be performed. The addition of the compliant converter by the users is carried out by, for example, downloading the compliant converter from an Internet website via the network 12 to store the converter in the HDD 35 of the printer 30, or connecting devices outside of the apparatus (for example, USB memory devices or the like) storing the compliant converter to the USB port 27*a* of the user PC 20 so as to store the converter stored in the devices outside of the apparatus in the HDD 35 of the printer 30.

There is below explained correspondence between each component in the embodiment and that in the invention. The HDD 35 in the embodiment corresponds to the memory device in the invention; the CPU 32 and the conversion control program 40 correspond to the obtaining unit and conversion control means, respectively. In addition, in the embodiment, an example of the program of the invention is described by explaining operation of the controller 31 and HDD 35 as the printing management apparatus. Furthermore, in the embodiment, an example of the printing management method of the invention is described by explaining operation of the printer 30.

According to the printer 30 of the above-described embodiment, a compliant converter which is selected from a plurality of converters 42*a* to 42*c* in the conversion program 42 and supports a print job in the hot folder 50 converts the print job in the hot folder 50 into print data and stores the data in the standby folder 54. The above advantage makes any of the plurality of converters process the print job, so that more formats of the print jobs may be supported. In addition, the compliant converter may be obtained from the outside of the printer 30 and added to the conversion program 42 so as to support the print job in the hot folder 50, even when there is not the compliant converter in the conversion program 42. Therefore, changes in specifications are excluded in the conversion control program 40, the first to third converters 42*a* to 42*c* in the conversion program 42, the spooler 46, and the printing mechanism 36, so that more formats of the print jobs in the hot folder 50 are allowed to be more easily supported.

It should be noted that the invention is not limited to the described embodiments and that various modifications and alterations may be practiced in so far as they are within the technical scope of the invention.

In the above-described embodiments, when the selected converter supports the print job, the selected converter temporarily transfers the print job in the hot folder 50 to the selected folder and then converts the print job in the selected folder into print data to store the data in the standby folder 54. The print job in the hot folder 50 may be converted into the print data and stored in the standby folder 54 without being transferred to the selected folder. Furthermore, in the above embodiments, when the print job is converted into the print data and stored in the standby folder 54, the print data is stored in the sub-standby folder 56 created in the standby folder 54. However, the creation of the sub-standby folder 56 may be omitted.

In the above embodiments, when there is not an undetermined converter on the add-in list 44, it is determined whether or not the compliant converter is obtained from the outside of the printer 30. When the compliant converter is obtained, the compliant converter is obtained and added to the conversion program 42 in the HDD 35, and when the compliant converter is not obtained, users are notified of information of the absence of the compliant converter. On the other hand, the information of the absence of the compliant converter may be notified to the users without determining whether or not the compliant converter is obtained from the outside of the printer 30. In this case, even when the compliant converter is obtained from the outside of the printer 30, setting may be made so that the compliant converter is not obtained from the outside of the printer 30 prior to notifying the users of the absence of the compliant converter.

In the above embodiments, it is determined whether or not the compliant converter is obtained from the outside of the printer 30 after determining whether or not the print job in the hot folder 50 is supported by any of the converters in the conversion program 42. However, for example, when image data (for example, RAW data) and the compliant converter are stored in devices outside of the apparatus (for example, USB memory devices) connected to the USB port 27a, the compliant converter may be obtained from the devices outside the apparatus following a command from the users before determining whether or not any of the converters in the conversion program 42 supports the print job in the hot folder 50.

In the above embodiments, a printing mechanism is described as the printing mechanism 36 having an ink jet system in full color. In addition, the printing mechanism may be an electro-photographic printing mechanism in full color, a thermal transfer printing mechanism in full color, a dot impact printing mechanism in full color, or may be these kinds of printing mechanism in black and white.

In the above embodiments, although the printer 30 includes a printing management apparatus, the mentioned printing management apparatus may be provided outside the printer 30. In addition, in the above embodiments, although the printing mechanism 36 is included in the printer 30, the printing mechanism 36 may be included in a facsimile, a copy machine, or the like.

In the above embodiments, a printing management apparatus is described. In addition, description of the embodiments may be made in a form of a printing management method, or in a form of a program making each process of the printing management method be executed in one or more computers.

What is claimed is:

1. A printing management apparatus comprising:
a memory device storing information and including a shared folder for storing a print job including image data and a job definition format file received from the outside of the apparatus, a standby folder for storing print data including the image data and a modified job definition format file to be output to a predetermined printing mechanism, and a converter having a plurality of conversion modules performing a conversion process in which the print job is converted into the print data which is printed in the predetermined printing mechanism to store the print data in the standby folder when the format of the print job in the shared folder is supported, wherein the conversion process includes writing printing settings to the job definition format file received from the outside to generate the modified job definition format file for storage in the standby folder;
an obtaining unit for obtaining the print job stored in the shared folder; and
a conversion control means for selecting a compliant conversion module from the plurality of conversion modules in the converter, the compliant conversion module performing the conversion process to the print job obtained by the obtaining unit, the compliant conversion module being the conversion module which supports the format of the print job obtained by the obtaining unit,
wherein the printing management apparatus, including the converter having the plurality of conversion modules, is part of a printer device.

2. The printing management apparatus according to claim 1, wherein the conversion control means performs a determination process on the basis of a predetermined sequence until it is determined that a selected conversion module supports the print job obtained by the obtaining unit while the selected conversion module being changed, the selected conversion module being selected from the conversion modules in the converter, and the determination process determining whether or not the selected conversion module supports the print job, and
wherein the selected conversion module determined performs the conversion process as the compliant conversion module when the conversion control means determines that the selected conversion module supports the print job obtained from the obtaining unit.

3. The printing management apparatus according to claim 1, wherein, as the conversion process of the print job obtained by the obtaining unit, the conversion control means transfers the print job into a related folder related to the compliant conversion module and converts the transferred print job into print data to store the data in the standby folder.

4. The printing management apparatus according to claim 1, wherein the conversion control means obtains the compliant conversion module from the outside of the printing management apparatus to add the module to the converter and performs the conversion process with the added compliant conversion module when there is not the compliant conversion module but the compliant conversion module is obtained from the outside of the printing management apparatus.

5. The printing management apparatus according to claim 1, wherein the conversion control means outputs unsupported information indicating absence of the compliant conversion module when there is not the compliant conversion module.

6. The printing management apparatus according to claim 1, wherein each of the plurality of conversion modules performs, during the conversion process, at least one of the printing settings of settings for an amount of ink in printing, a color in the printing, and addition of a predetermined image.

7. A printing management method, the method comprising the steps of:
(a) storing a shared folder for storing a print job including image data and a job definition format file received from the outside of the apparatus;
(b) storing a standby folder for storing print data including the image data and a modified job definition format file to be output to a predetermined printing mechanism;
(c) storing a converter having a plurality of conversion modules performing a conversion process in which the print job is converted into the print data which is printed in the predetermined printing mechanism to store the print data in the standby folder when the format of the print job in the shared folder is supported,
(d) obtaining the print job stored in the shared folder; and (e) selecting a compliant conversion module from the plurality of conversion modules in the converter, and the compliant conversion module performing the conversion process to the print job obtained in the process (a)-(d), the compliant conversion module being the conversion module which supports the format of the print job obtained in the process (d), wherein the printing management apparatus, including the converter having the plurality of conversion modules, is part of a printer device, wherein the conversion process includes writing printing settings to a job definition format file received from the outside of the apparatus to generate the modified job definition format file for storage in the standby folder, and wherein the steps are executed by a processor.

8. The printing management apparatus according to claim 6, wherein the printing settings include settings for ejecting ink from each nozzle of the predetermined printing mechanism.

9. The printing management apparatus according to claim 8, wherein the settings for ejecting ink from each nozzle include settings for adjusting dot sizes based on aging of each nozzle of the predetermined printing mechanism.

10. The printing management method according to claim 7, wherein the printing settings include settings for at least one of an amount of ink in printing, a color in the printing, and addition of a predetermined image.

11. The printing management method according to claim 10, wherein the printing settings include settings for ejecting ink from each nozzle of the predetermined printing mechanism.

12. A printing management method according to claim 11, wherein the settings for ejecting ink from each nozzle include settings for adjusting dot sizes based on aging of each nozzle of the predetermined printing mechanism.

13. The printing management apparatus according to claim 2, wherein the predetermined sequence is based on an order in an add-in list.

* * * * *